May 15, 1951      W. S. GAINES      2,552,954

MECHANISM FOR SPREADING POWDERED MATERIAL

Filed May 4, 1944

INVENTOR.
Walter S. Gaines
BY
Mann, Brown & Co.
ATT'YS.

Patented May 15, 1951

2,552,954

UNITED STATES PATENT OFFICE 2,552,954

MECHANISM FOR SPREADING POWDERED MATERIAL

Walter S. Gaines, Bainbridge Township, Geauga County, Ohio, assignor to The S. K. Wellman Company, Cleveland, Ohio, a corporation of Ohio Application May 4, 1944, Serial No. 534,065

8 Claims. (Cl. 78—0.5)

This invention relates to apparatus for spreading powdered material, and more particularly to a spreader blade assembly for spreading or distributing powdered metal material in a mold.

One of the objects of the invention is the provision of a new and improved spreader assembly for uniformly distributing powdered metal in a mold in such a manner as to obtain uniform thickness and uniform column density of the article, together with novel means for smoothing the upper surface of each charge before pressure is applied to the material.

Another object of the invention is the provision of a new and improved spreader member or spreader blade assembly adapted to operate in a circular mold, and having its leading face at such an angle to the radius of rotation that the material will not be caused to move or gravitate toward the circumference of the mold but will be distributed evenly and smoothly over the entire surface of each charge.

A still further object of the invention is the provision of a new and improved spreader member or spreader blade assembly in which the powdered material engaging portion of the spreader member is of material that will not magnetically affect such powdered material during the operation of the apparatus.

Another object of the invention is the provision of a new and improved spreader mechanism for use in manufacturing powdered metal briquettes that is simple in construction and efficient in operation.

Other and further objects and advantages of the invention will appear from the following description taken in connection with the accompanying drawing in which.

Figure 4:
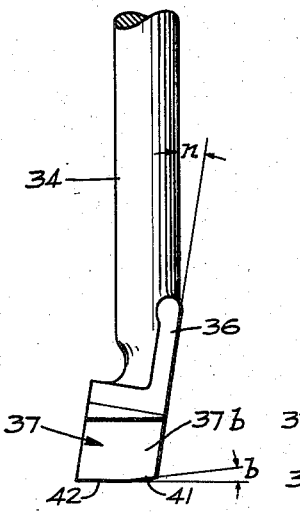
Fig. 4 is a side elevation of the spreader blade assembly, with parts broken away.

Designing mechanism for spreading and smoothing powdered material in rotating molds in such a manner that the charge will be reduced to a uniform thickness and uniform density was found to involve numerous difficulties and no small amount of serious problems. It was discovered, after a great deal of experimenting, for instance, that the leading or front face of the spreader member should be arranged at a slight angle to the radius of the circular mold, so that the outer end of this face will be slightly in advance of its inner end, as otherwise the material tends to move radially outwardly during the spreading operation, due probably, more or less, to centrifugal action, and which resulted in a non-uniform density of the product throughout its extent.

It was also discovered that unless the leading face of the spreader member be inclined forwardly, the powdered material tended to pile up excessively in front of that member as the mold rotated. It was also found that unless the bottom face, or the powdered material engaging face, of the spreader blade have its forward portion inclined forwardly and upwardly to a limited extent, the material passed over by the blade during the rotation of the mold would tend to rise or boil up immediately at the rear of the blade as it passed over the material, thus leaving the surface of the material rough and pitted. The forward inclination of the front face of the spreader blade, and the upward inclination of the forward portion of the bottom face thereof, tend to pack the material in such manner that the surface thereof is not violently agitated as the blade member passes thereover but leaves the surface more or less packed and smooth.

It had also been noted that under certain conditions the spreader blade became more or less magnetic and would attract particles of iron in the ground material as it passed over the same, causing a pitted surface, and these attracted particles would attract others and would drag around over the face of the material, thus also roughening the same to a certain extent.

The present invention seeks to remedy these difficulties by the provision of a new and improved arrangement of spreader blade assembly and mechanism for operating the same, which will now be described.

Referring now to the drawing, the reference character 10 designates the apparatus for spreading powdered material which comprises a base 11, a standard 12 extending upwardly therefrom, and to which is secured a bracket 13 on the upper end of which is mounted a turntable 14, adapted to be rotated by a motor 15 in the usual manner. The turntable 14 is adapted to have mounted thereon an annular mold 16. The mold 16 comprises an outer ring member 17, a core or inner member 18, and a spacer ring 19 seated in the space between the ring and core members. The mold is adapted to be held in position on the turntable by a centering pin 21, which engages an axial opening in the bottom of the core member. The pin is adapted to be raised and lowered by a lever 22. When the pin is lowered the mold may be slid from the turntable.

The upper end of the standard 12 has attached thereto brackets 23, 24, which are provided with suitable bearings through which a stem member 25 is slidably mounted for vertical movement. Suitable means are provided for raising and lowering the stem member 25. As shown, a rack and pinion arrangement 26 is provided for this purpose. The pinion is journaled in the bracket 24, and engages a rack on the stem 25. The pinion is rotated by a hand wheel 27 for raising and lowering the spreader blade assembly, as will readily appear. The lower end of the stem 25 is provided with a laterally extending spreader supporting arm 28, and the spreader member or spreader assembly 29 is adjustably connected to the outer end of this arm.

Suitable means are provided for automatically elevating the stem member 25, and with it the spreader member 29. As shown, mechanism 31, operated by a motor 32, is provided for this purpose. The mechanism for accomplishing this function is substantially the same as that shown in patent to Wellman, No. 2,240,971, of May 6, 1941, for Method and Apparatus for Spreading Powdered Material, to which reference is made for a disclosure of this mechanism. This mechanism will gradually elevate the spreader member while the table is rotating. Since the details of the apparatus shown are described in that patent, it is not thought necessary to repeat the same at this time. Any other suitable mechanism could be employed for rotating the mold and for slowly elevating the spreader blade during the operation of the device. The spreader member 29 is supported in such a manner that it may be raised and lowered into the annular space 33 between the annular ring 16 and the core 18. It is so attached to the arm 28 that it may be adjusted angularly about the axis of the shank or stem 34, and is held in position by clamping means 35.

The spreader member or spreader blade assembly 29 comprises the shank or stem 34 (Figs. 3 and 4), which is rigidly connected to an angle member 36 in any suitable manner, as by arc welding, soldering, or the like. The spreader blade is shown at 37, and is rigidly attached to the angle member 36, as by being welded or soldered thereto. This blade has what will be termed an inner side face 37ª, an outer side face 37ᵇ, and front and rear faces 38ª and 38ᵇ, respectively. The front face 38 of the angle member 36, and the front face 36ª of the spreader blade, are in alinement and together form the front face of the spreader blade assembly. Likewise, the rear faces of the angle member 36 and the rear face of the spreader blade are in alinement, and together form the rear face of the spreader blade assembly. The side faces, however, of the spreader blade are shown as being slightly offset laterally outwardly from the planes of the side faces of the angle member for affording clearance for the angle member.

The blade 37 is of non-magnetic material, so as not to disturb the powdered ferrous material during the operation of the device. It may be of cemented carbides or Hadfield manganese steel, or other suitable wear resistant and non-magnetic material.

In order that the material shall be spread properly by the spreader blade as the mold rotates, the leading face of the spreader assembly 29 is arranged at a slight angle to the vertical. Proper spreading requires that the material be piled up to a slight extent in front of the spreader blade and rolled over so as to achieve a mild degree of turbulence. Unless this is obtained, a layer of nonuniform density will result. However, the material should not be rolled over or agitated for too great a length of time or segregation will occur in the powder metal; that is, prolonged agitation will result in separation of the various components of the mix and the lighter weight elements, such as graphite will segregate in one layer and the heavier components, such as lead, will segregate in another layer. Thus, the angle of inclination of the leading face of the spreader assembly 29 must be such as to secure the necessary small pile of material which is to be rolled over as the mold rotates and yet avoid the formation of too high a pile of material which is agitated for too long a period of time before it passes under the spreader blade.

We have found that satisfactory results are obtained by inclining the leading face 38ª of the spreader assembly 29 at an angle to the vertical of about 9°, as shown by the angle $n$ in Fig. 4. This angle is not too critical and may be varied to a certain extent. The angle selected is advantageous also in that it gives a convenient viewing angle for the operator but it primarily functions to impart the desired turbulence to the material and feed it downwardly beneath the spreader blade, as is obvious from an inspection of said figure.

In order to prevent churning or boiling upwardly of the material after it has been passed over by the spreader blade immediately at the rear of the latter, it has been found that if the bottom surface or face 39 of the blade (Fig. 3) be angular, viz: formed of two faces 41 and 42 arranged at a slight angle to each other, this difficulty will be eliminated. As shown, the following or rear face 42 is substantially horizontal, and at substantially right angles to the axis of the shank or stem 34, and the forward or leading face 41 inclines upwardly and forwardly, as indicated by the angle $b$ in Fig. 4. This angle is more or less critical. An angle of 2° has given excellent results, and insures a gradual entering of the powdered metal under the blade and a smooth spreading of the material. The angle, however, may be varied to a certain extent, both above and below that amount. But this angle has given satisfactory results in actual practice over a period of several months.

Figure 6:
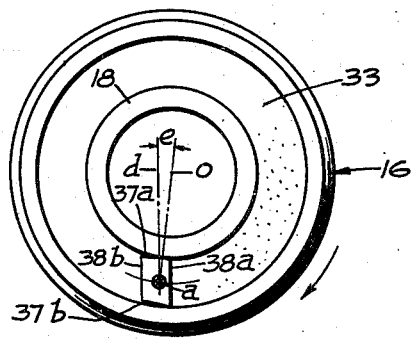
Fig. 6 is a top plan view of the mold and spreader in position therein, shown diagrammatically.

When the horizontal or longitudinal axis of the blade is arranged in, or parallel with, the radius of the mold—that is, when the front face of the spreader blade is radially arranged—it was found that the material tended to be shifted away from the center of the mold, making the circumferential portion slightly denser than the central portion. In order to overcome this difficulty the longitudinal axis, or, more accurately, the front face of the blade is arranged at a slight angle to the radius, and it was found by experiment that when it is arranged at an angle of about 3½°, with the outer end in advance of the inner end of the blade, as indicated by the angle e in Fig. 6, satisfactory results were obtained.

In other words, if o be the vertical axis of the mold, and a be the vertical axis of the stem around which the spreader blade may be rotatably adjusted, the line oa will be radial to the mold. Now draw the line ad so that e will be an angle of 3½°, then adjust the spreader blade 37 so that its front 38ª will be parallel with the line ad, the angle oad will be the required angle; and the angle at which the blade should be arranged will depend, of course, upon the rotational speed of the mold. The blade is so arranged that its outer end is in advance of its inner end, so as to tend to crowd the material inwardly to counteract the centrifugal action of the mold tending to cause the material to move out toward the circumference of the rotating mass. Since the longitudinal axis of the blade is at an angle to the radius of the mold, the end faces of the blade must necessarily be arranged at an angle to said axis in order that the blade may properly fit within the annular space between the rim of the mold and the core member 18. This would vary with the radius or diameter of the mold.

Figures 2, 5:
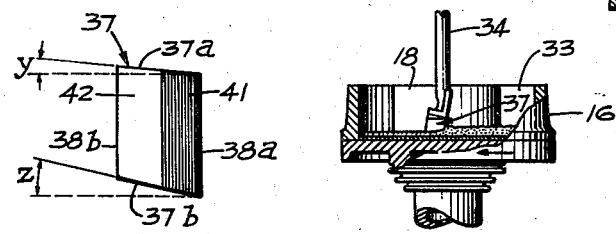
Fig. 2 is a side elevation of the mold, with parts in section and parts broken away.
Fig. 5 is a bottom plan view of the same.

With a mold having an outside diameter of from 1.938 inches up to 4.625 inches, the angle formed by the faces 37ª and 38ª is about 98°. In other words, the angle y (Fig. 5), formed by the side face 37ª and a line normal to the front edge of the face 38ª is substantially 8°. Likewise, the angle formed by the front face 38ª and side face 37ᵇ is around 75°; that is, the angle formed by the side face 37ᵇ and a line normal to the front edge of the face 38ª is about 15°, as shown by the angle z in Fig. 5.

Figure 3:
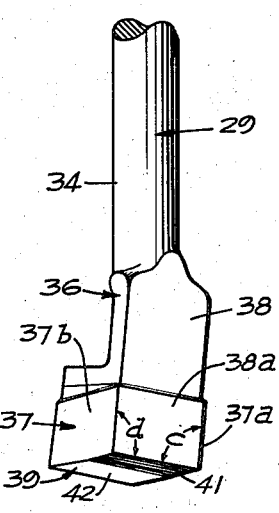
Fig. 3 is a perspective view of the spreader blade assembly, with parts broken away.
Figure 1:
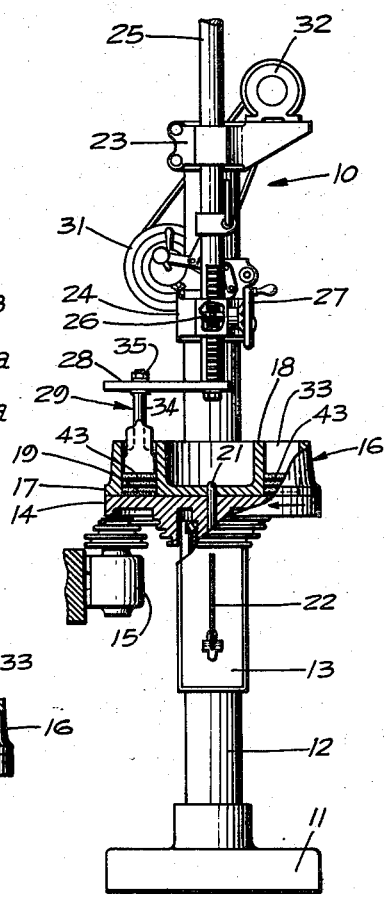
Fig. 1 is a side elevation of the apparatus with which the spreader blade assembly is associated, with parts in section, parts broken away, and shown more or less diagrammatically.

As a result of the construction of the spreader blade and positioning the same so that the longitudinal axis thereof will be at an angle to the radius of the mold, the angle formed by the side face 37ª and bottom face portion 41 will be about 89½°, as shown by the angle c in Fig. 3; and the angle formed by the side face 37ᵇ and the portion 41 of the bottom face is about 90½°, as shown by the angle d in Fig. 3. These angles are mere incidents of the peculiar construction of the spreader blade.

In the operation of the device, a charge of material is placed in the mold and the blade, which is vertically movable but not rotatable, is lowered to the bottom of the mold by the hand wheel 27, after which the elevating mechanism 31 is operated by the motor 32 to gradually elevate the blade while the mold is being rotated by the motor 15. After the blade has been elevated above the level of the charge, a spacer member 43 is inserted, following which another charge is introduced and the operation repeated. Other charges and other spacers may be added until the mold is as full as desired.

The mold herein shown is preferably, though not necessarily, rotated at around fifty revolutions per minute, while the operating mechanism for the spreader blade will elevate the blade in about sixty seconds.

The apparatus shown for rotating the mold with respect to the spreader blade is provided with mechanisms to automatically elevate the blade, but it is obvious that the blade may be elevated by hand if desired. Similarly, the relative movement of the mold and spreader blade may be achieved by hand. Thus, the improved blade of my invention can also be used in the hand-operated blade disclosed in Wellman Patent No. 2,240,971, but in such case, the clearance angle z would be larger to permit the blade to be used in the corner of a rectangular mold.

While one specific construction of the spreader member has been described, it is understood that this is by way of example only, and that changes may be made in the form and construction of the device, and the degrees of the various angles may be varied, without departing from the spirit of the invention as expressed in the appended claims.

I claim as my invention:

1. Apparatus for spreading a charge of powdered material so that the charge will be of uniform thickness throughout its mass and have uniform column density comprising an annular mold for receiving a charge of powdered material, means for rotating the mold, a spreader blade of material thickness, means mounting the spreader blade so that its front spreader face forms a slight angle to the radius of the mold, whereby its outer end is slightly in advance of its inner end for counteracting the centrifugal tendency of the material during the rotation of the mold, the leading face of said spreader blade being inclined upwardly and forwardly, and the forward portion of the bottom face of said blade being inclined upwardly and forwardly for lightly compressing the material during the rotating of the mold.

2. Apparatus for spreading a charge of powdered material so that the charge will be of uniform thickness throughout its mass and have uniform column density comprising an annular mold for receiving a charge of powdered material, means for rotating the mold, agitating means for agitating the charge of material from the bottom upward during the rotation of the mold, means for crowding the material radially inwardly in the mold for counteracting the centrifugal action of the mold tending to move the agitated material at the surface radially outwardly, and means for lightly compressing the material during the spreading operation to prevent boiling up of said material after each passage of said agitating means.

3. In a spreader blade assembly, a block of nonmagnetic material having a front face inclined forwardly and upwardly, and having the rear portion of its bottom face substantially horizontal and having the forward portion of said bottom face inclined forwardly and upwardly and an elongated stem rigidly conected to, and extending upwardly from, said block at a slight angle thereto.

4. A spreader blade assembly comprising a spreader blade of material length, width and thickness and having a forwardly and upwardly inclined front face, an angle member rigidly secured to said blade and having an inclined front face in alinement with the inclined front face of said spreader blade, and a stem extending upwardly from said angle member at approximately right angles to the rear portion of the bottom face of said spreader blade.

5. In a spreader blade assembly, a spreader blade comprising a block adapted to operate in an annular mold, said block having a front face inclined forwardly and upwardly and having an inner face arranged at greater than a right angle to the front face and provided with an outer face arranged at an angle less than a right angle to the front face and an elongated stem rigidly connected to, and extending upwardly from, said block at a slight angle thereto.

6. In a spreader blade assembly, a spreader blade comprising a block adapted to operate in an annular mold and having its front face inclined upwardly and forwardly at about 9°, and having the front portion of its bottom face inclined upwardly and forwardly at an angle of around 2° to the rear portion of said bottom face, and the rear portion of said bottom face being in a substantially horizontal plane and an elongated stem rigidly connected to, and extending upwardly from, said block at a slight angle thereto.

7. In a spreader blade assembly, a spreader blade comprising a block adapted to operate in an annular mold and having its front face inclined upwardly and forwardly, and provided with an angular bottom face the front portion of which inclines upwardly and forwardly, the outer side of said block being arranged at an acute angle to the front face and the inner side at an obtuse angle to said front face.

8. Apparatus for spreading powdered material comprising a mold having an annulus-shaped mold chamber, means for rotating said mold, a spreader blade, means holding said blade within said chamber with the longitudinal axis of the blade at a slight angle to the radius of the mold and with its outer end in advance of its inner end just sufficient to counteract the centrifugal tendency of the material during the rotation of the mold, and its forward face at a forward inclination to the bottom of the mold, and means for slowly elevating said blade within said chamber while said mold is rotating for spreading powdered material within said chamber for rendering the same of uniform thickness and of uniform column density.

WALTER S. GAINES.

REFERENCES CITED

The following references are of record in the file of this patent:

UNITED STATES PATENTS

| Number | Name | Date |
|---|---|---|
| 375,895 | Robertson | Jan. 3, 1888 |
| 522,339 | Evenden | July 3, 1894 |
| 770,859 | Hudson et al. | Sept. 27, 1904 |
| 926,893 | Pignarre | Mar. 8, 1907 |
| 1,958,409 | Kohler | May 15, 1934 |
| 1,972,457 | Obrien | Sept. 4, 1934 |
| 1,981,468 | Roseby | Nov. 20, 1934 |
| 2,214,787 | Dickhaut et al. | Mar. 3, 1938 |
| 2,240,971 | Wellman | May 6, 1941 |